United States Patent [19]
Johansson et al.

[11] Patent Number: 5,799,506
[45] Date of Patent: Sep. 1, 1998

[54] METHOD AND APPARATUS FOR COOLING A PRODUCT USING A CONDENSED GAS

[75] Inventors: Sven-Ake Johansson, Enskede; Per Olof Ekeblad, Djursholm, both of Sweden

[73] Assignee: AGA AB, Lidingo, Sweden

[21] Appl. No.: 714,040

[22] PCT Filed: Mar. 3, 1995

[86] PCT No.: PCT/SE95/00228

§ 371 Date: Sep. 6, 1996

§ 102(e) Date: Sep. 6, 1996

[87] PCT Pub. No.: WO95/24585

PCT Pub. Date: Sep. 14, 1995

[30] Foreign Application Priority Data

Mar. 7, 1994 [SE] Sweden .................. 9400755

[51] Int. Cl.[6] .................................................. F25J 5/00
[52] U.S. Cl. .................. 62/616; 62/50.1; 62/430; 62/903
[58] Field of Search .................. 62/50.1, 50.2, 62/430, 903, 616, 913

[56] References Cited

U.S. PATENT DOCUMENTS 3,712,073  1/1973  Arenson .................. 62/50.2
4,170,115  10/1979  Ooka et al. .................. 62/50.2
4,224,802  9/1980  Ooka .................. 62/50.2

FOREIGN PATENT DOCUMENTS 2250875  4/1974  Germany .

*Primary Examiner*—Henry A. Bennett
*Assistant Examiner*—Pamela A. O'Connor
*Attorney, Agent, or Firm*—Pearne, Gordon, McCoy & Granger LLP

[57] ABSTRACT

A method of chilling, cooling or likewise refrigerating a product with the aid of the cold content of a condensed gas, wherein the product, preferably in a gas or liquid state, is caused to pass at least one product-cooling heat-exchanger. According to the invention, the condensed gas is vaporized in at least one evaporation heat-exchanger and the vaporized gas is delivered to the product-cooling heat-exchanger for cooling the product therein. The gas heated by the product in the product-cooling heat-exchanger is then returned to the evaporation heat-exchanger for vaporization of the condensed gas therein. The invention also relates to an arrangement for use in carrying out the method.

16 Claims, 5 Drawing Sheets

5,799,506

METHOD AND APPARATUS FOR COOLING A PRODUCT USING A CONDENSED GAS

BACKGROUND OF THE INVENTION

The present invention relates to a method of cooling, chilling or refrigerating a product with the aid of the cold content of a condensed gas, referred to hereinafter as cooling, wherein the product is caused to pass through at least one product cooling heat-exchanger, preferably in a gas or liquid state. The invention also relates to an arrangement for use when carrying out the method.

Many large gas consumers have the gas delivered in a condensed state. When the gas is to be used, the gas is normally vaporized in an air evaporator. The use of an air evaporator results in the loss of the cold content of the condensed gas. In order to be able to recover the cold that is at present lost in this way, there is needed flexible and inexpensive equipment which can be used for cooling a number of different products, preferably in a gas or liquid state, without the products being frozen. Neither should the equipment used require separate drive means, such as pumps or fans, or other energy consuming units, since all supplied energy that must be chilled off contributes to increasing the cooling losses. The equipment shall also be able to operate without the use of an additional heat transfer medium of low freezing point that is cooled by the condensed gas and in turn cools the product, since such means requires the use of a pump or like device which supplies energy to the heat transfer device and therewith reduces the cold content thereof.

SUMMARY OF THE INVENTION

The main object of the present invention is to provide a method and an arrangement for utilizing the cold content of condensed gas highly efficiently with the aid of simple and inexpensive standard components which do not require the use of pumps, fans or other energy supplying equipment and which will eliminate the risk of the product to be cooled being frozen.

The invention is based on the understanding that this object can be achieved by cooling the product with the aid of the cold gas that is obtained when vapourizing, or evaporating, the condensed gas, and by using the gas heated in the cooling process to effectively vapourize the condensed gas, and by vapourizing the condensed gas and cooling the product in separate heat-exchangers of standard type. Naturally, one requirement of the invention is that the temperature of the product to be cooled lies above the boiling point of the condensed gas used.

According to the present invention, the particular characteristics of a method of the kind defined in the first paragraph reside in vapourizing the condensed gas in at least one evaporation heat-exchanger, delivering the evaporated or vapourized gas to the product cooling heat-exchanger to cool the product therein, and by returning the gas heated by the product in the product cooling heat-exchanger back to the evaporator heat-exchanger to vapourize the condensed gas therein.

Thus, according to the invention, product cooling is achieved with the aid of the condensed gas after the gas has been vapourized, while also using the gas as a heat transfer medium. The risk of the product becoming frozen is minimized by virtue of the fact that the condensed gas does not come into direct contact with the product. Furthermore, as the vapourized gas merely cools the product indirectly, through the medium of the partition walls in the heat-exchanger, the gas and the product never come into contact with one another. The heat-exchanger used is conveniently comprised of standard components of co-flow, contraflow or cross-flow type. As a result of the separate components, the components may in themselves be optimized to achieve an effective process, which as a result of the use of standard components can be achieved at low cost.

For the purpose of further improving the recovery of the cold content of the condensed gas, the product is cooled suitably in at least two series-connected product-cooling heat-exchangers, wherein the gas vapourized in the evaporation heat-exchanger is delivered to one of said heat-exchangers as the cooling medium, or refrigerant, and the gas which is used to vapourize the gas in the evaporation heat-exchanger and which is now cold is delivered as a cooling medium to the other of said series-connected heat-exchangers. This method therewith enables cold to be recovered from the gas returned to the evaporation heat-exchancer.

In order to ensure that the heat content of the gas delivered to the evaporation heat-exchanger is sufficient to completely vapourize the condensed gas therein, even after cooling products to low temperatures, it may be ensured that a larger mass flow will pass on the hot side of the evaporation heat-exchanger than on the cold side thereof.

The condensed gas is preferably divided between two or more evaporation heat-exchangers and the gas vapourized therein is delivered commonly to one of the product-cooling heat-exchangers, wherein the gas heated therein is returned to said one evaporation heat-exchanger to vapourize that part of the condensed gas that passes therethrough, wherein the thus chilled or cooled gas is delivered to the other of said product-cooling heat-exchangers, and wherein the gas heated therein is returned to the other of said evaporation heat-exchangers to vapourize that part of the condensed gas that passes therethrough.

In the case of a particularly preferred embodiment of the aforedescribed process which uses two evaporation heat-exchangers, the product is cooled in three series-connected product-cooling heat-exchangers, wherein the gas which is cooled by vapourization of the condensed gas and returned to said other evaporation heat-exchanger is delivered to the additional product-cooling heat-exchanger. This embodiment enables the use of the cold content of the gas that is returned to the other evaporation heat-exchanger.

According to the invention, it is preferred generally to always use one more product-cooling heat-exchanger than the number of evaporation heat-exchangers.

The condensed gas may be nitrogen, argon, oxygen, carbon dioxide or natural gas, for instance.

The main characteristic features of an arrangement for use when carrying out the method are evident from the following apparatus claims.

BRIEF DESCRIPTION OF THE DRAWINGS

The invention will now be described in more detail with reference to exemplifying embodiments thereof and also with reference to the accompanying drawings.

DETAILED DESCRIPTION OF THE PREFERRED EMBODIMENTS

Figure 1:
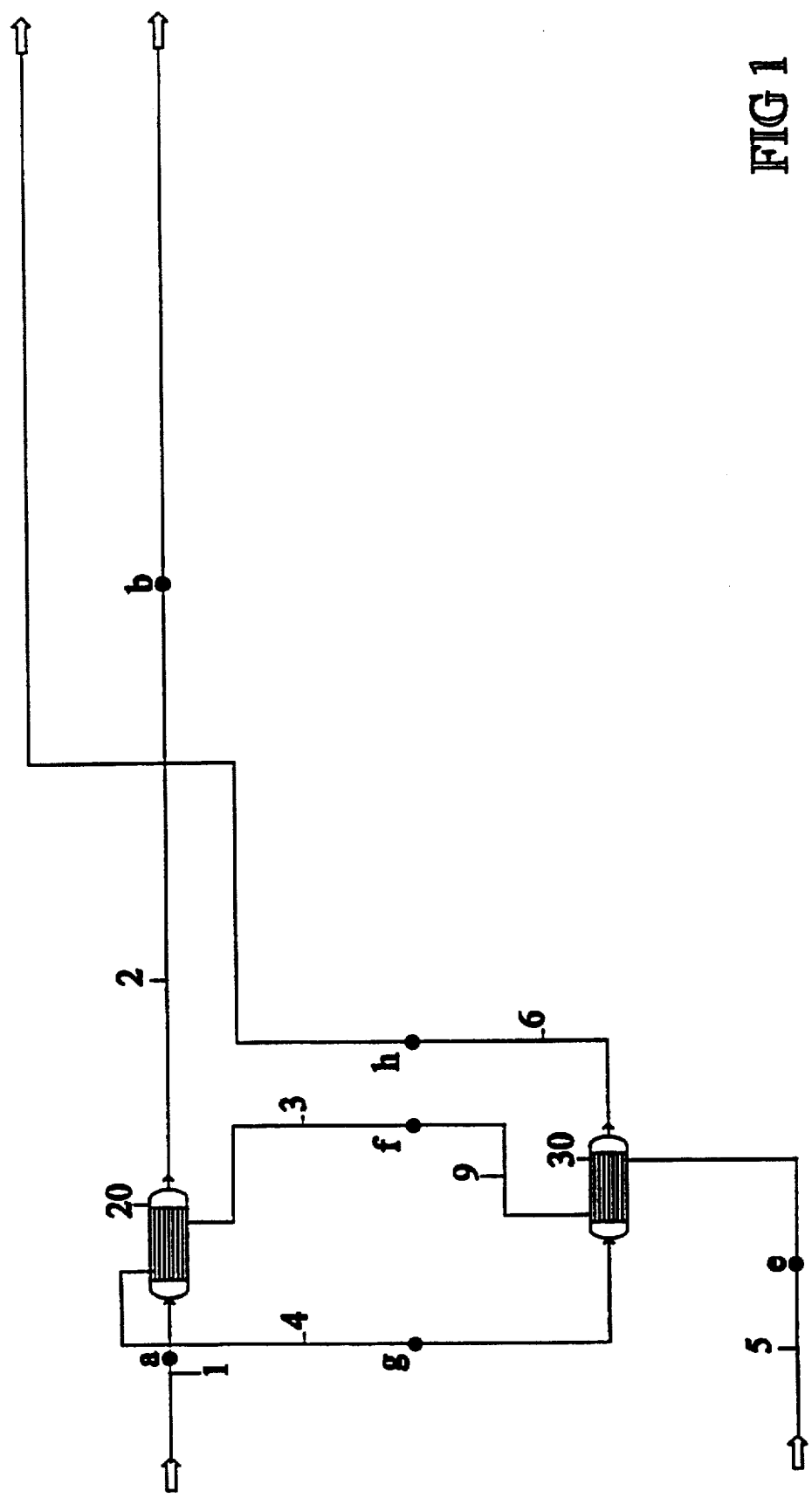
FIG. 1 is a principle diagram of an inventive arrangement which includes a product-cooling heat-exchanger and a condensed-gas evaporation heat-exchanger.

Shown in FIG. 1 is a product-cooling heat-exchanger 20 and a condensed-gas vapourizing heat-exchanger 30. Both heat-exchangers are of a standard type and operate with indirect heat transference between the cold and the hot (warm) medium, i.e. there is no direct contact between the medium. The heat-exchangers may be of the co-flow, contraflow or cross-flow type.

The product to be cooled, chilled or likewise refrigerated is delivered, suitably in a liquid or gaseous state, to the heat-exchanger 20 through a conduit 1, wherein the cooled product leaves the heat-exchanger through a conduit 2. The cooling medium, or refrigerant, which according to the invention is comprised of a vapourized gas of lower boiling point than the temperature of the product, is delivered to the heat-exchanger 20 through a conduit 3 and departs through a conduit 4.

The vapourized gas in the conduit 3 is obtained from the evaporation heat-exchanger 30, to which condensed gas, e.g. liquid nitrogen, is delivered through a conduit 5. The condensed gas is vapourized in the heat-exchanger 30, by returning to the heat-exchanger 30, through the conduit 4, the gas that is heated when cooling the product in the heat-exchanger 20, whereafter the gas is discharged through the conduit 6.

In the aforedescribed arrangement, a product is cooled indirectly by means of the cold content of a condensed gas, with insignificant risk of the product being frozen and without using a separate heat transfer device and pump or fan means to this end. This is achieved by using the gas that has been vapourized from the condensed gas as a heat transfer medium, which is driven around the system by an overpressure generated in the input conduit.

An important advantage gained with this arrangement is that cooling of the product and vapourization of the gas take place in two separate heat-exchangers, which may be of very simple and inexpensive standard design and each of which can be optimized to provide the best possible result. The arrangement thus requires no specially manufactured components and can be constructed entirely from commercially available standard components.

With the intention of illustrating the function of the arrangement, there is given in Table 1, Appendix 1, by way of example, those measurement values obtained with data simulation at the measuring points marked in the FIG. 1, wherein the product is assumed to be water having a temperature of 40° C. and the condensed gas is assumed to be liquid nitrogen having a temperature of −169° C., in the illustrated case.

Figure 2:
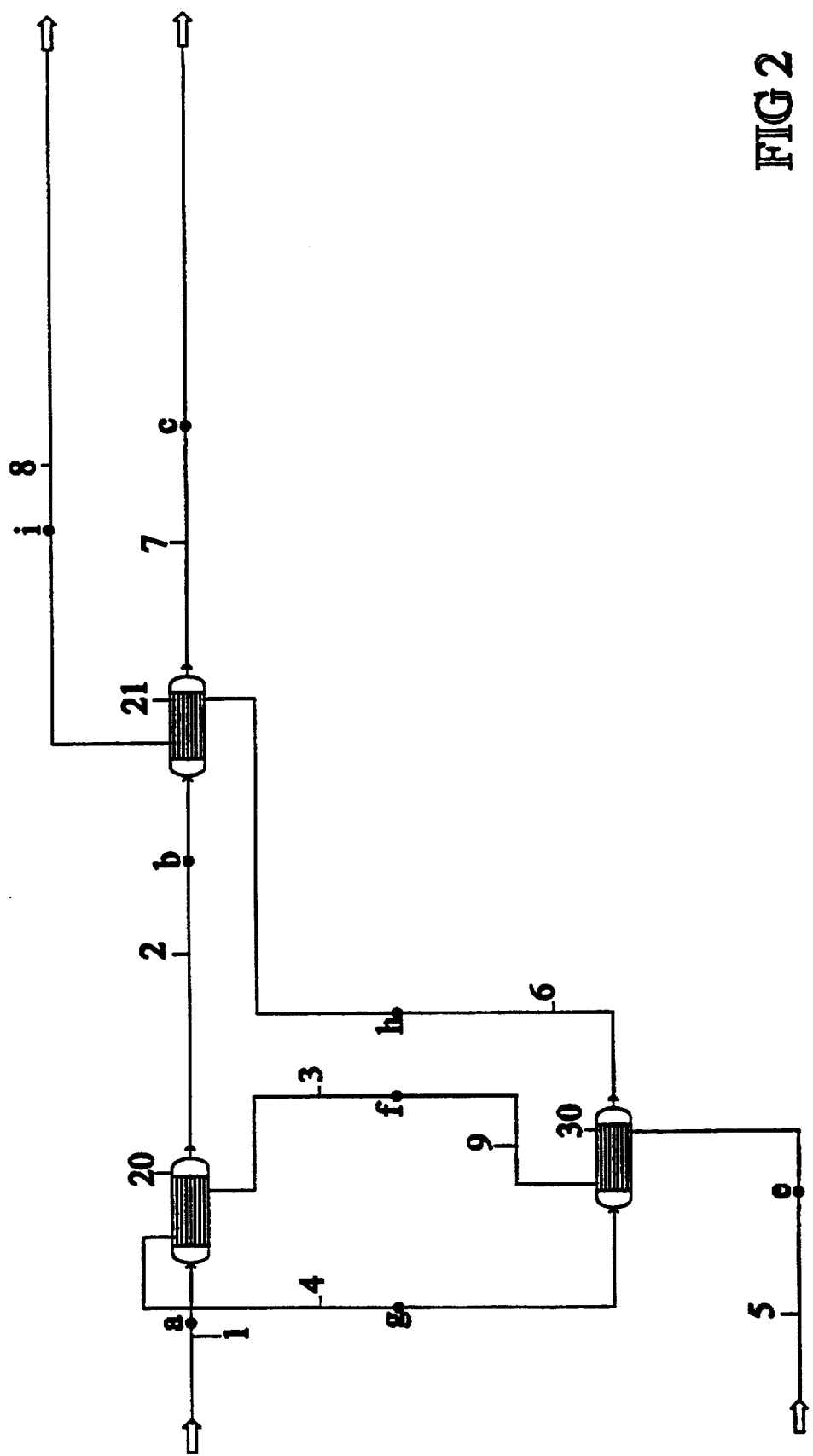
FIG. 2 illustrates an embodiment which includes two product-cooling heat-exchangers and one evaporation heat-exchanger.

FIG. 2 illustrates an embodiment in which there is also recovered part of the cold content in the gas which is used to vapourize gas in the heat-exchanger 30 and which is therewith cooled in the process, this cooled gas leaving the heat-exchanger through the conduit 6. To this end, a further product-cooling heat-exchanger 21 is connected in series with the heat-exchanger 20 and the cooled or chilled gas is delivered to said heat-exchanger through the conduit 6. The product is thus further cooled in the further product-cooling heat-exchanger before being discharged through the conduit 7. The gas used to cool the product in the heat-exchanger 21 leaves the heat-exchanger through the conduit 8.

The cold content of the condensed gas originally delivered is used more effectively in this latter embodiment, as will be evident from the data simulated values set forth in Table 2, Appendix 1, this data relating to a circuit arrangement according to FIG. 2. Naturally, the positions of the heat-exchangers 20 and 21 in the circuit may be reversed if so desired, so that the product will first be delivered to the heat-exchanger 21 and thereafter to the heat-exchanger 20.

In order for the arrangement to function according to calculations, it is necessary to achieve complete evaporation, or vapourization, of the condensed gas delivered to the evaporation heat-exchanger. In order to achieve complete vapourization, it is necessary for the gas that is delivered to the evaporation heat-exchanger 30 from the product-cooling heat-exchanger 20 to contain sufficient heat to this end. This can be ensured, even when cooling a product which has a relatively low input temperature, by causing the mass flow on the hot side of the heat-exchanger 30 to be larger than the mass flow which passes on the cold side of said heat-exchanger. This enables the heat quantity to be adapted in accordance with the heat required to achieve complete vapourization, even at low temperatures.

Figure 3:
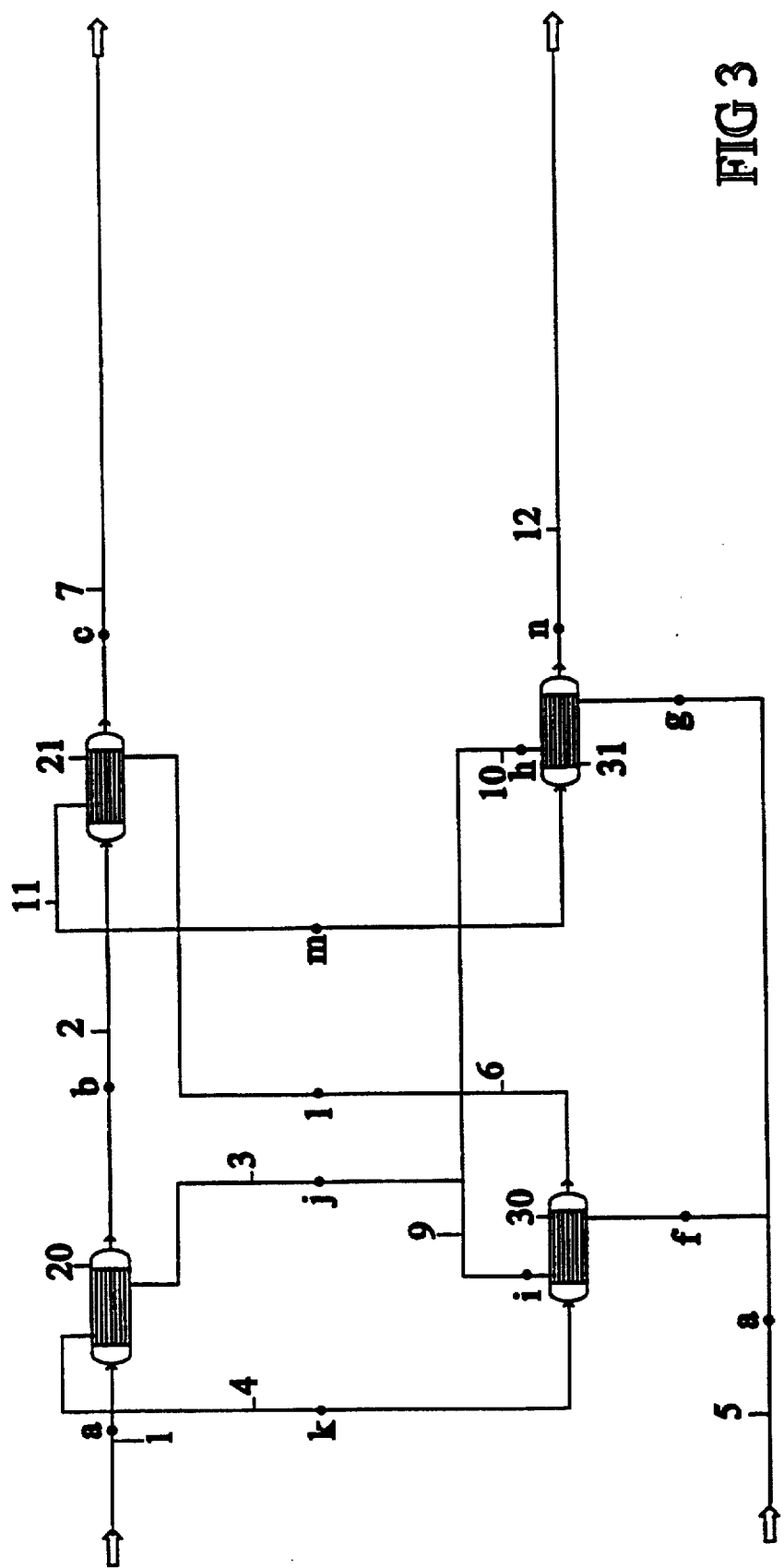
FIG. 3 illustrates another embodiment which includes two product-cooling heat-exchangers and two evaporation heat-exchangers.

As illustrated in FIG. 3, the condensed gas entering the conduit 5 may accordingly be divided into two subflows, each being vapourized in a respective evaporation heat-exchanger 30 and 31. The vapourized gas subflows are delivered through respective conduits 9 and 10 to the common conduit 3 which, as in the earlier described embodiments, delivers the total flow to the heat-exchanger 20. After being heated in the heat-exchanger 20, the total gas flow is then returned to the evaporation heat-exchanger 30 through the conduit 4, in which heat-exchanger 30 only half of the total amount of condensed gas delivered through the conduit 5 shall be vapourized, for instance. Thus, the gas flow on the hot side of the heat-exchanger will be twice as large as the flow on the cold side thereof. The gas flow chilled in the heat-exchanger 30 then passes to the aforesaid further product-cooling heat-exchanger 21, in which it is heated and then returned to the further evaporation heat-exchanger 31, through the conduit 11. Thus, the further evaporation heat-exchanger 31 also receives the total hot gas flow for evaporation or vapourization of the other half of the condensed gas. The gas then leaves the heat-exchanger 31 through a conduit 12.

This embodiment enables the heat content of the whole of the vapourized gas flow to be used to vapourize in each stage solely half of the total amount of condensed gas, thereby ensuring complete vapourization of the gas.

Similar to the case of the earlier described embodiments, Table 3, Appendix 2, discloses by way of example only some of the measurement values obtained at the measurement points given in the FIG. 3 by data simulation. Naturally, the positions of the heat-exchangers 20 and 21 in the circuit may also be reversed in this case, if so desired.

Figure 4:
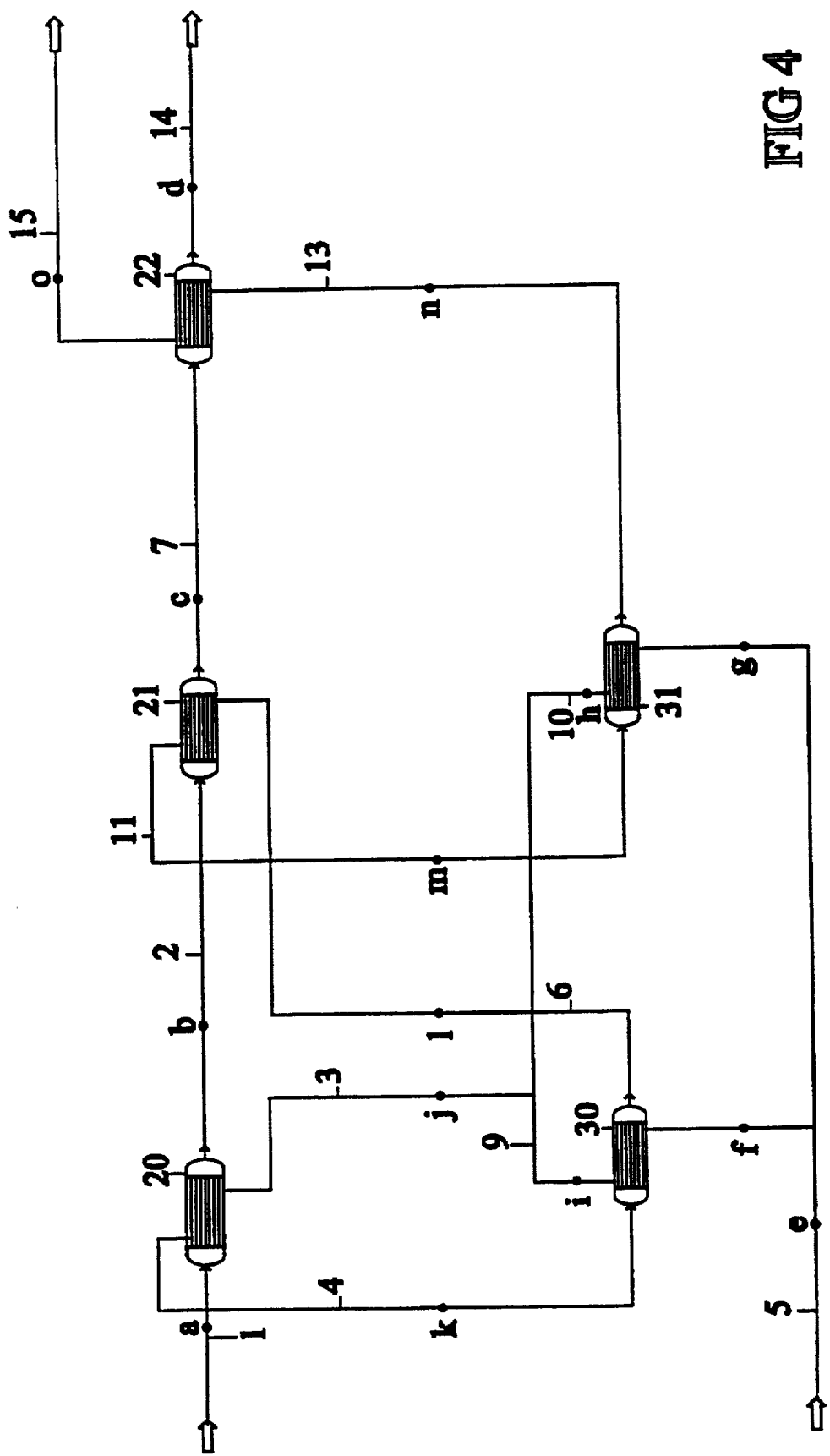
FIG. 4 illustrates a preferred embodiment of an inventive arrangement which includes three product-cooling heat-exchangers and two evaporation heat-exchangers, with the product-cooling heat-exchangers coupled in "co-flow" as seen in the flow direction of the product.

FIG. 4 illustrates an example of the embodiment of an inventive arrangement most preferred, which for the purpose of recovering cold from the second evaporation heat-exchanger 31 also includes a third product-cooling heat-exchanger 22. The gas that was returned to the second evaporation heat-exchanger 31 and cooled therein as a result of the vapourization process is delivered to the third heat-exchanger 22 through a conduit 13 for further cooling of the product in said heat-exchanger 22. The product is discharged through a conduit 14 and the gas is discharged through a conduit 15.

The function of this arrangement, in which the three product-cooling heat-exchangers 20–22 are connected in co-flow with regard to the direction of flow of the product, will be evident from the values given by way of example in Table 4, Appendix 3.

Figure 5:
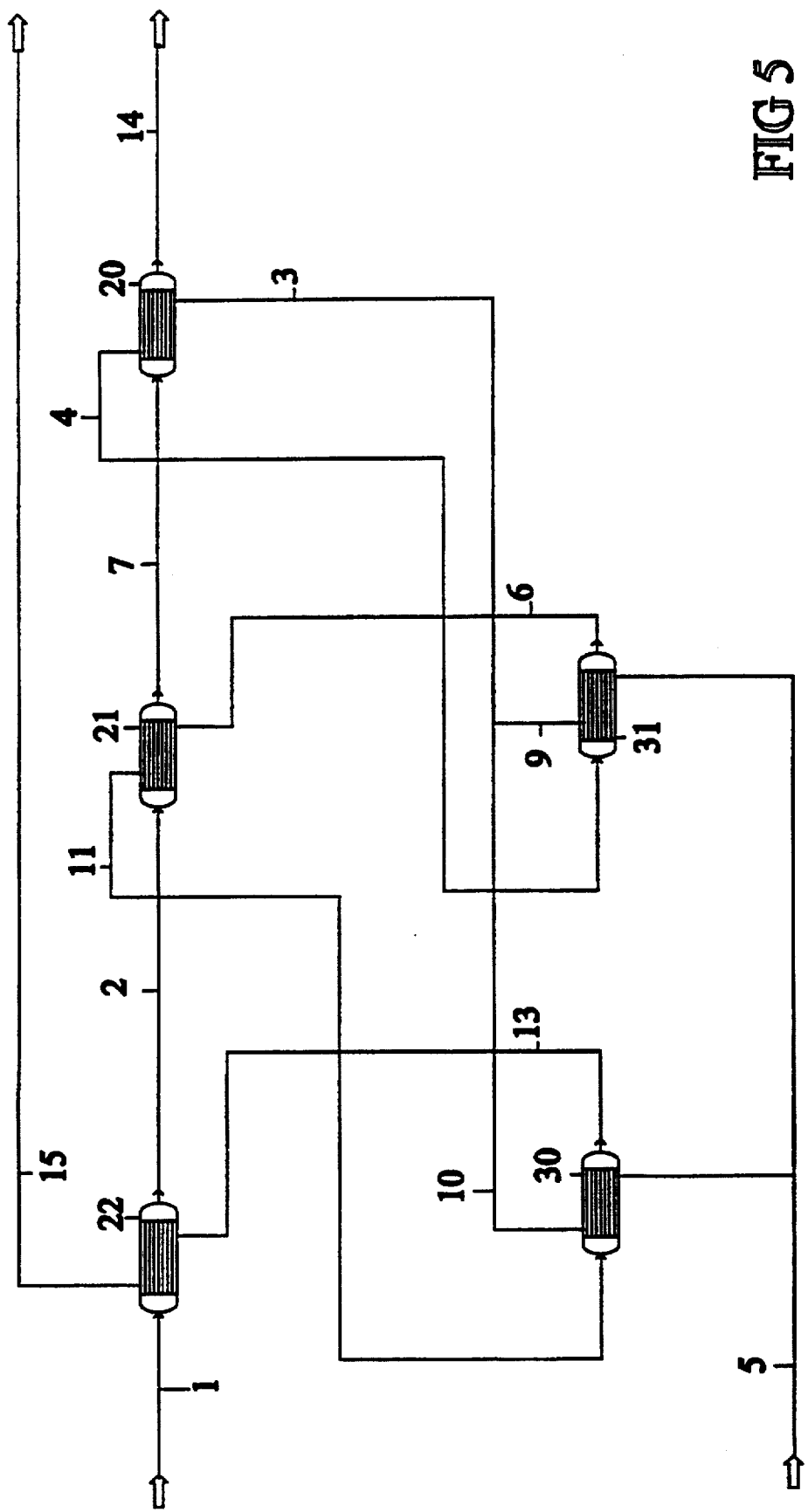
FIG. 5 illustrates an embodiment corresponding to the FIG. 4 embodiment, but in which the product-cooling heat-exchangers are coupled in "contraflow".

FIG. 5 illustrates an arrangement which corresponds to the arrangement shown in FIG. 4 but in which the order between the product-cooling heat-exchangers 20–22 has been changed to obtain a "contraflow" heat-exchanger connection with regard to the direction of product flow. The order in which the heat-exchangers are arranged may also be changed so as to obtain different combinations of the embodiments illustrated in FIGS. 4 and 5.

In the case of the embodiments illustrated in FIGS. 2, 4 and 5, the number of product-cooling heat-exchangers is greater than the number of evaporation heat-exchangers, which improves the yield of cold in the condensed gas. Thus, if the number of evaporation heat-exchangers is increased to more than the two heat-exchangers included in the FIGS. 4 and 5 embodiments, the three product-cooling heat-exchangers will also be increased by the same number in order to maintain said difference. The invention is therefore not restricted to the number of heat-exchangers illustrated in the drawings but that this number can be chosen in accordance with requirements, wherewith the person skilled in this art will be able to connect the heat-exchangers in a manner which will provide optimal functioning in each individual case.

The invention can be applied for cooling different products and the person skilled in this art will be able to chose an appropriate condensed gas for each application, for instance nitrogen, argon, oxygen, carbon dioxide or natural gas.

TABLE 1

APPENDIX 1

| | a | b | e | f | g | h |
|---|---|---|---|---|---|---|
| Temperature, °C | 40 | 25 | −169 | −169 | 20 | −96 |
| Pressure, bars | 2.0 | 1.9 | 10.0 | 9.9 | 9.8 | 9.7 |
| Proportioning gas phase | 0 | 0 | 0 | 1 | 1 | 1 |
| Nitrogen, kg/hour | 0 | 0 | 500 | 500 | 500 | 500 |
| Water, kg/hour | 1680 | 1680 | 0 | 0 | 0 | 0 |

TABLE 2

| | a | b | c | e | f | g | h | i |
|---|---|---|---|---|---|---|---|---|
| Temperature, °C | 40 | 25 | 16 | −169 | −169 | 20 | −96 | 22 |
| Pressure, bars | 2.0 | 1.9 | 1.8 | 10.0 | 9.9 | 9.8 | 9.7 | 9.6 |
| Proportioning gas phase | 0 | 0 | 0 | 0 | 1 | 1 | 1 | 1 |
| Nitrogen, kg/hour | 0 | 0 | 0 | 500 | 500 | 500 | 500 | 500 |
| Water, kg/hour | 1680 | 1680 | 1680 | 0 | 0 | 0 | 0 | 0 |

TABLE 3

APPENDIX 2

| | a | b | c | e | f | g | h | i | j | k | l | m | n |
|---|---|---|---|---|---|---|---|---|---|---|---|---|---|
| Temperature, °C | −50 | −61 | −69 | −169 | −169 | −169 | −169 | −169 | −169 | −70 | −127 | −64 | −122 |
| Pressure, bars | 2.0 | 1.9 | 1.8 | 10 | 10 | 10 | 9.9 | 9.9 | 9.9 | 9.8 | 9.7 | 9.6 | 9.5 |
| Proportioning gas phase | 0 | 0 | 0 | 0 | 0 | 0 | 1 | 1 | 1 | 1 | 1 | 1 | 1 |
| Methanol, kg/hour | 2000 | 2000 | 2000 | | | | | | | | | | |
| Nitrogen, kg/hour | | | | 500 | 250 | 250 | 250 | 250 | 500 | 500 | 500 | 500 | 500 |

TABLE 4

APPENDIX 3

| | a | b | c | d | e | f | g | h | i | j | k | l | m | n |
|---|---|---|---|---|---|---|---|---|---|---|---|---|---|---|
| Temperature, °C | −50 | −61 | −69 | −75 | −169 | −169 | −169 | −169 | −169 | −169 | −70 | −127 | −64 | −122 |
| Pressure, bars | 2.0 | 1.9 | 1.8 | 1.8 | 10.0 | 10.0 | 10.0 | 9.9 | 9.9 | 9.9 | 9.8 | 9.7 | 9.6 | 9.5 |
| Proportioning gas phase | 0 | 0 | 0 | 0 | 0 | 0 | 0 | 1 | 1 | 1 | 1 | 1 | 1 | 1 |
| Methanol, kg/hour | 2000 | 2000 | 2000 | 2000 | | | | | | | | | | |

TABLE 4-continued

APPENDIX 3

| | a | b | c | d | e | f | g | h | i | j | k | l | m | n |
|---|---|---|---|---|---|---|---|---|---|---|---|---|---|---|
| Nitrogen, kg/hour | | | | | 500 | 250 | 250 | 250 | 250 | 500 | 500 | 500 | 500 | 500 |

I claim:

1. A method of cooling a product using a condensed gas, said method comprising the steps of: passing the product through a first product-cooling heat-exchanger; vapourizing the condensed gas in a first evaporation heat exchanger; delivering the vapourized gas to the first product-cooling heat-exchanger so as to cool the product therein; and returning the gas that is heated by the product in the product-cooling heat-exchanger back to the first evaporation heat-exchanger for vapourization of the condensed gas therein.

2. A method according to claim 1, further comprising the steps of: passing the product through a second product-cooling heat exchanger connected in series with the first product-cooling heat exchanger; and delivering the gas which is used to vapourize the condensed gas in the first evaporation heat-exchanger and which is cooled thereby to the second product-cooling heat exchanger as a cooling medium.

3. A method according to claim 2, further comprising the steps of: dividing the condensed gas between the first evaporation heat-exchanger and a second evaporation heat exchanger; commonly delivering the gas vapourized in said first and second evaporation heat-exchangers to the first product-cooling heat-exchanger; returning the gas heated in the first product-cooling heat-exchanger to the first evaporation heat-exchanger to vapourize the condensed gas therein; delivering the gas cooled in the first evaporation heat-exchanger to the second product-cooling heat-exchanger; and returning the gas heated in the second product-cooling heat exchanger to the second evaporation heat-exchanger for vapourization of the condensed gas therein.

4. A method according to claim 3, further comprising the steps of: passing the product through a third product-cooling heat exchanger connected in series with the first and second product-cooling heat exchangers; and delivering the gas which is returned to said second evaporation heat-exchanger and which is cooled during vapourization of the condensed gas therein to the third product-cooling heat-exchanger.

5. A method according to claim 1, wherein the condensed gas is comprised of condensed nitrogen.

6. A method according to claim 1, wherein the condensed gas is comprised of condensed argon.

7. A method according to claim 1, wherein the condensed gas is comprised of condensed oxygen.

8. A method according to claim 1, wherein the condensed gas is comprised of condensed carbon dioxide.

9. A method according to claim 1, wherein the condensed gas is comprised of condensed natural gas.

10. An arrangement for cooling a product with a condensed gas, said arrangement comprising: a first product-cooling heat exchanger (20) through which the product is intended to pass; a first evaporation heat-exchanger (30) for vapourizing the condensed gas; means (3) for delivering the vapourized gas to the first product-cooling heat-exchanger (20) for cooling the product therein; and means (4) for returning the gas heated by the product in the first product-cooling heat-exchanger (20) to the first evaporation heat-exchanger (30) for vapourization of the condensed gas therein.

11. An arrangement according to claim 10, further comprising: a second product-cooling heat exchanger connected in series with the first product-cooling heat exchanger; and means (6) for delivering the gas that is used to vapourize the condensed gas in the first evaporation heat-exchanger and is cooled thereby to the second product-cooling heat exchanger as a cooling medium.

12. An arrangement according to claim 11, further comprising a second evaporation heat exchanger; means for dividing the condensed gas between said first and second evaporation heat-exchangers; means (3) for delivering to the first product-cooling heat-exchanger the total flow of the gas vapourized in the first and second evaporation heat-exchangers; means (4) for returning the gas heated in said first product-cooling heat-exchanger (20) to the first evaporation heat-exchanger (30) for vapourization of the condensed gas therein; means (6) for delivering the gas cooled in the first evaporation heat-exchanger to the second product-cooling heat-exchanger; and means (11) for returning the gas heated in the second product-cooling heat-exchanger to the second evaporation heat-exchanger (31) for vapourization of the condensed gas therein.

13. An arrangement according to claim 12, further comprising: a third product-cooling heat exchanger connected in series with the first and second product-cooling heat exchangers; and means (13) for delivering the gas which is returned to said second evaporation heat-exchanger (31) and cooled therein to the third product-cooling heat-exchanger (22).

14. An arrangement according to claim 10, wherein the first product-cooling heat-exchanger and the first evaporation heat-exchanger are comprised of separate heat-exchangers of the co-flow type.

15. An arrangement according to claim 10, wherein the first product-cooling heat-exchanger and the first evaporation heat-exchanger are comprised of separate heat-exchangers of the contraflow type.

16. An arrangement according to claim 10, wherein the first product-cooling heat-exchanger and the first evaporation heat-exchanger are comprised of separate heat-exchangers of the cross-flow type.

* * * * *

UNITED STATES PATENT AND TRADEMARK OFFICE
CERTIFICATE OF CORRECTION

PATENT NO.  : 5,799,506
DATED       : September 1, 1998
INVENTOR(S) : Johansson et al.

It is certified that error appears in the above-identified patent and that said Letters Patent is hereby corrected as shown below:

Column 3, line 60, delete "the" (second occurrence).

Column 4, line 62, delete "the" (first occurrence).

Column 6-8, Table 4, please insert column o as follows:
-- o

-72
9.5
1

500        --.

Signed and Sealed this

Fifteenth Day of December, 1998

Attest:

BRUCE LEHMAN

Attesting Officer

Commissioner of Patents and Trademarks